United States Patent [19]
Doble

[11] Patent Number: 4,782,992
[45] Date of Patent: Nov. 8, 1988

[54] METHOD OF FORMING ARTICLES

[75] Inventor: Gordon S. Doble, Shaker Heights, Ohio

[73] Assignee: Textron Inc., Providence, R.I.

[21] Appl. No.: 933,436

[22] Filed: Nov. 21, 1986

[51] Int. Cl.[4] ............................................. B32B 15/14
[52] U.S. Cl. .................................... 228/190; 428/608; 29/419.1
[58] Field of Search .................. 228/190, 243; 29/419; 428/608

[56] References Cited

U.S. PATENT DOCUMENTS

| | | | |
|---|---|---|---|
| Re. 31,355 | 8/1983 | Rozmus | 419/49 |
| 2,100,159 | 11/1937 | Curstadt | 428/608 |
| 2,533,698 | 5/1951 | Brahs | 29/419 X |
| 2,577,187 | 12/1951 | Fox | 29/419 R X |
| 3,668,748 | 6/1972 | Divecha et al. | 29/419 R |
| 3,788,926 | 1/1974 | Weisinger | 156/286 |
| 3,807,013 | 4/1974 | Sukenik | 29/419 R X |
| 3,821,841 | 7/1974 | Goodwin | 29/419 R |
| 4,060,412 | 11/1977 | Divecha | 29/419 R |
| 4,292,725 | 10/1981 | Larsson et al. | 29/419 R |
| 4,305,449 | 12/1981 | Loszewski et al. | 164/80 |
| 4,455,334 | 6/1984 | Ogino et al. | 428/37 X |
| 4,697,324 | 10/1987 | Grant et al. | 29/419 R |

*Primary Examiner*—Kenneth J. Ramsey
*Attorney, Agent, or Firm*—Edward J. Timmer

[57] ABSTRACT

An improved method of forming an article includes providing continuous, woven, flat, helical tape of filaments and a continuous flat, helical tape of foil. The two helical tapes are interleaved to form a helical assembly having turns of filaments alternating with turns of foil. Deformation forces are applied against the turns of the helical assembly in a direction parallel to the central axis of the helix to bond the turns of the tapes off oil and filament together while maintaining the filaments free of axially extending forces. During the bonding of the turns of the helical foil and filament tapes, the tapes may be bonded to a housing or other component of an article to be reinforced. Radial reinforcing can be provided by including in the helical assembly a layer having filaments with central axes which are radial relative to the central axes of the filaments of the helical tape.

15 Claims, 4 Drawing Sheets

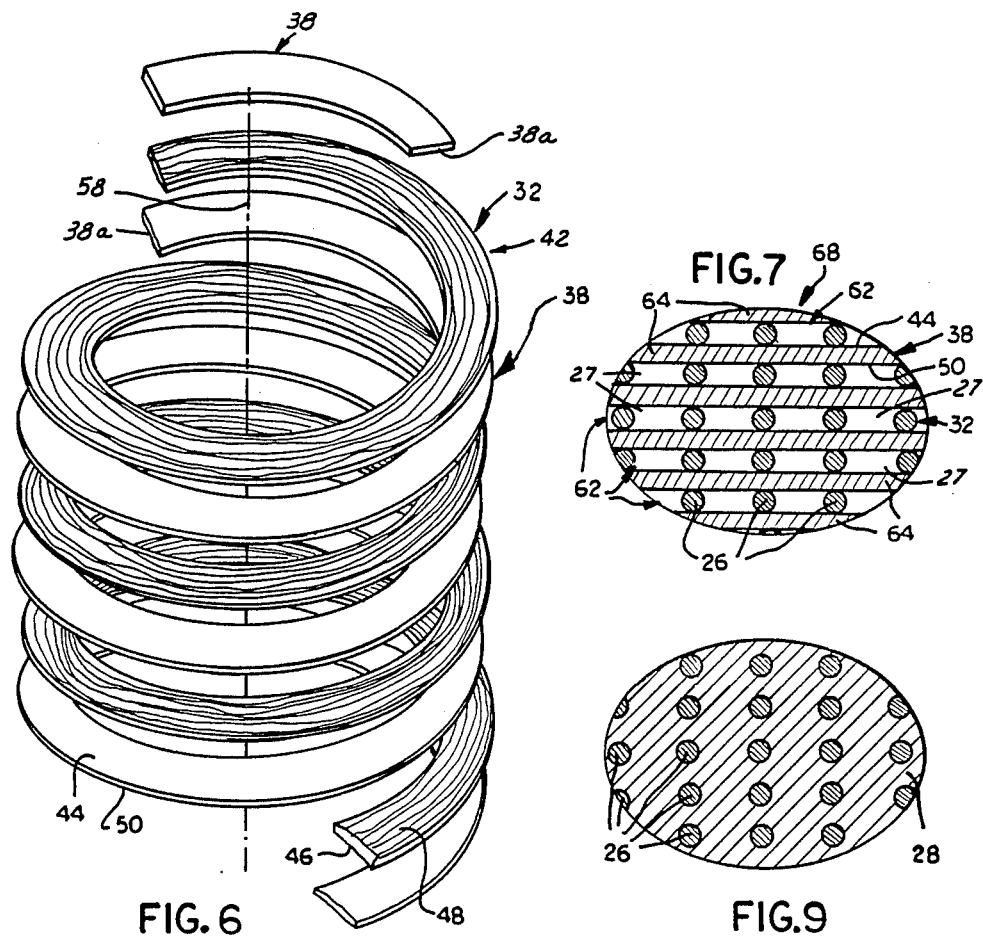
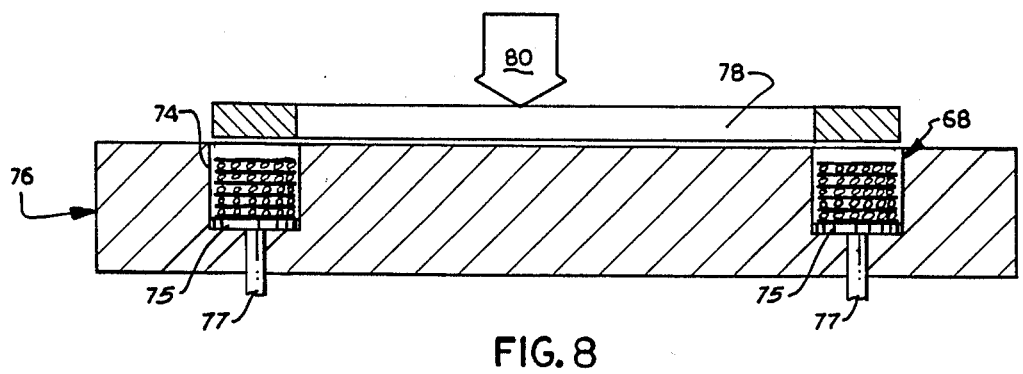

METHOD OF FORMING ARTICLES

BACKGROUND OF THE INVENTION

The present invention relates to a new and improved method of forming a filamentary reinforced article and articles formed thereby.

During the forming of filamentary reinforced articles, the reinforcing filaments tend to crack and/or buckle if they are subjected to tension or compression forces along the filament axis during a pressing operation. In order to avoid cracking and/or buckling of the filaments, a filamentary reinforced article may be formed in the manner disclosed in U.S. patent application Ser. No. 879,366 filed June 27, 1986 by Gordon S. Doble and entitled "Method of Forming Articles".

The patent application identified above discloses forming a filamentary reinforced article by winding a composite preform and a carrier strip around an axis to form a layered preform. The layers of the preform are then bonded together and densified by applying pressure forces in a direction generally parallel to the axis around which the layers of the preform were wound. The layers of the preform are bonded together and the density of the preform is increased without subjecting the reinforcing filaments to excessive tension or compression forces in a direction along the filaments.

SUMMARY OF THE INVENTION

The present invention provides a method of forming a filamentary reinforced article from a helical tape of filaments and a helical tape of metallic foil. The helical tape of filaments and the helical tape of foil are interleaved to form a helical assembly having alternate turns of filaments interspersed with turns of foil. Deformation forces are applied against the turns of the helical assembly in a direction parallel to the central axis of the helical assembly. These deformation forces bond the metal of the helical tape of foil to the filaments of the helical tape of filaments while maintaining the filaments substantially free of forces extending along the filament axis that could cause plastic deformation thereof such as cracking or buckling.

As the helical tape of filaments and the helical tape of foil are bonded together, they may also be bonded to a member which they are to reinforce. If desired, radial reinforcing can be provided between the turns of the double helix.

Accordingly, it is the object of this invention to provide a new and improved method of forming an article by interleaving helical filaments and foil and then applying force to consolidate and bond the turns of the helical filaments and foil together while maintaining the filaments free of plastic deformation forces extending along the axes of the filaments.

The present invention also provides a composite filament reinforced article comprising a consolidated metallic matrix and a plurality of relatively low ductility, high strength filaments extending helically through the matrix and diffusion bonded therein with the filaments being continuous from end to end and substantially free of plastic deformation evidenced by cracks or buckling along their length. For gas turbine disks or rings, the axis of the helix (helically extending filaments) is substantially coincident with the axis of rotation of the disk or ring.

BRIEF DESCRIPTION OF THE DRAWINGS

The foregoing and other objects and features of the present invention will become more apparent upon consideration of the following description taken in connection with the accompanying drawings wherein:

FIG. 6 is an illustration of a helical assembly formed by interleaving the helical tapes of FIGS. 2 and 4.

FIG. 7 is an enlarged fragmentary sectional illustration depicting the helical assembly of FIG. 6 in a closed condition with the turns of the helical assembly adjacent to each other.

FIG. 8 is a schematic illustration depicting the closed helical assembly of FIG. 7 in a die.

FIG. 9 is an enlarged fragmentary sectional illustration, similar to FIG. 7, of a portion of the article of FIG. 1 formed by bonding the turns of the helical assembly of FIG. 6 together.

DESCRIPTION OF SPECIFIC PREFERRED EMBODIMENTS OF THE INVENTION

Figure 1:
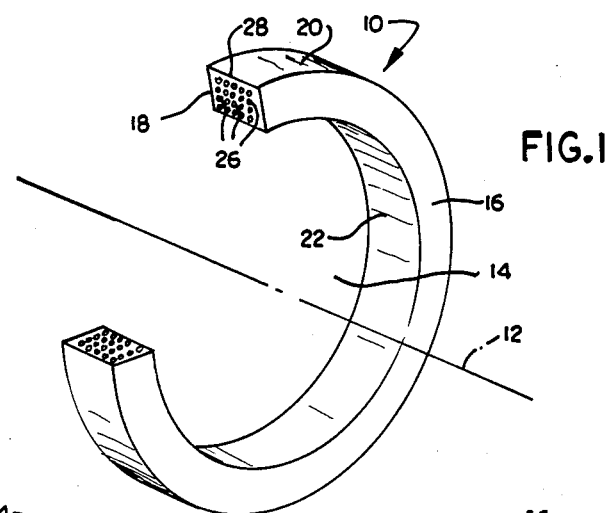
FIG. 1 is a partially broken away pictorial illustration of a filamentary article constructed in accordance with the method of the present invention.

An annular cylindrical filamentary reinforced article 10 is illustrated in FIG. 1. The article 10 is representative of numerous different articles of circular and noncircular cross-sectional configurations which can be made by the method of the present invention. The articles made using the method of the present invention can be used in many different environments. However, it is contemplated that the article 10 will be used as a reinforcing element for components of an aircraft and aerospace structure. For example, the article 10 could be a reinforcing element for a component which is rotated at high speeds during operation of a gas turbine engine such as a disk or ring on which compressor or turbine blades can be mounted.

The illustrated article 10 is an annular cylindrical ring having a central axis 12 which extends through a cylindrical central opening 14 in the ring. The ring has a pair of parallel circular side surfaces 16 and 18. The side surfaces 16 and 18 are interconnected by a cylindrical radially outer side surface 20 and a cylindrical inner side surface 22.

The article 10 is a consolidated one-piece structure formed of helical reinforcing mono-filaments 26 which are bonded together by and disposed in a metal matrix 28. The reinforcing filaments 26 can be of any one of many known compositions, such as boron, coated boron, silicon carbide, refractory metal, or ceramic. The filaments may also be yarns of materials such as graphite, alumina, or other ceramics. Also useful in the process are filaments already enveloped by a matrix or layer such as an infiltrated graphite aluminum wire preform. For such enveloped or coated preforms, the assembly of FIG. 6 would not necessarily employ foil as a matrix. The specific manner in which the filaments 26 are made and the specific composition of the filaments does not, per se, form a part of the present invention. However, the filaments 26 are relatively high strength, generally have limited or low ductility compared to the metal matrix, and reinforce the metal matrix 28 to enable the article 10 to withstand very high centrifugal forces under severe operating conditions.

Although the article 10 has been shown in FIG. 1 as being a cylindrical ring with rotational symmetry and with an open center, the article 10 could be a solid circular disk, that is a disk which does not have an opening in the center. In addition, the article 10 could have a configuration other than the illustrated circular configuration. For example, it is contemplated that the article 10 could be formed with an elliptical, a generally rectangular or even a nonsymmetrical configuration if desired. Of course, the specific configuration of the article 10 will depend on the environment in which the article 10 is to be used.

Figure 2:
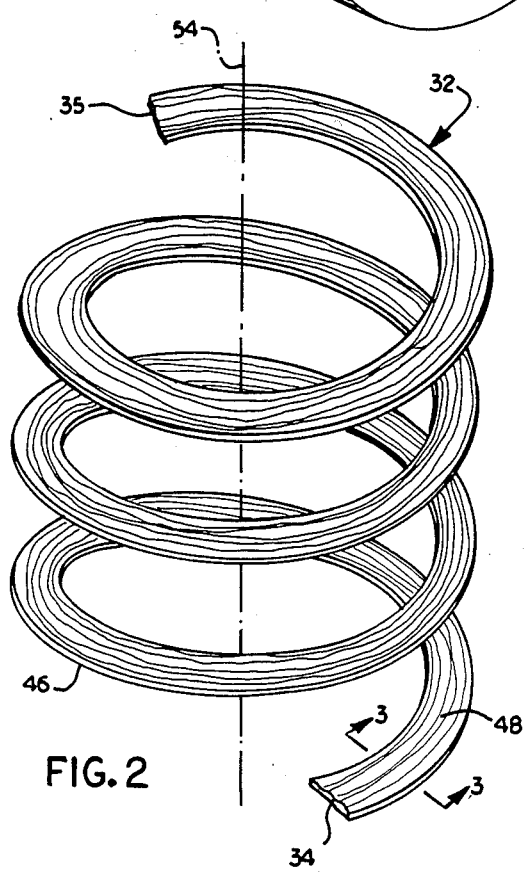
FIG. 2 is an illustration of a helical tape of filaments.
Figure 3:
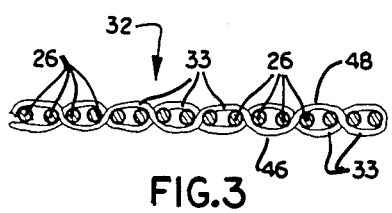
FIG. 3 is a sectional view, taken generally along the line 3—3 of FIG. 2, illustrating how helical filaments in the tape of FIG. 2 are interconnected.
Figure 5:
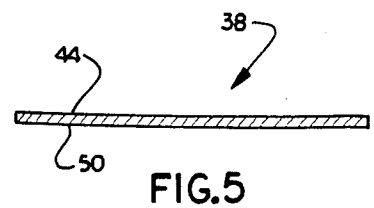
FIG. 5 is a sectional view, taken generally along the line 5—5 of FIG. 4, illustrating the construction of the helical tape of foil.

In order to form the article 10, a continuous, woven, flat-surfaced helical tape 32 (FIG. 2) of mono-filaments is provided. The helical filaments 26 are held in a side-by-side relationship at the desired radius and woven together by strands 33 of weaving thread ribbon, or wire (FIG. 3). The strands 33 of wire hold the filaments in a collimated (aligned) relationship with lateral spaces or voids 27 between the filaments and with the central axes of each of the filaments 26 disposed on a radius of the helix. Each turn of the helical tape 32 has the same inside and outside diameter. Each of the helical filaments 26 extends from a lower end 34 to the upper end 35 of the tape 32. Such a helical tape of mono-filaments has been obtained from Woven Stuctures, Inc., Compton, California.

Figure 4:
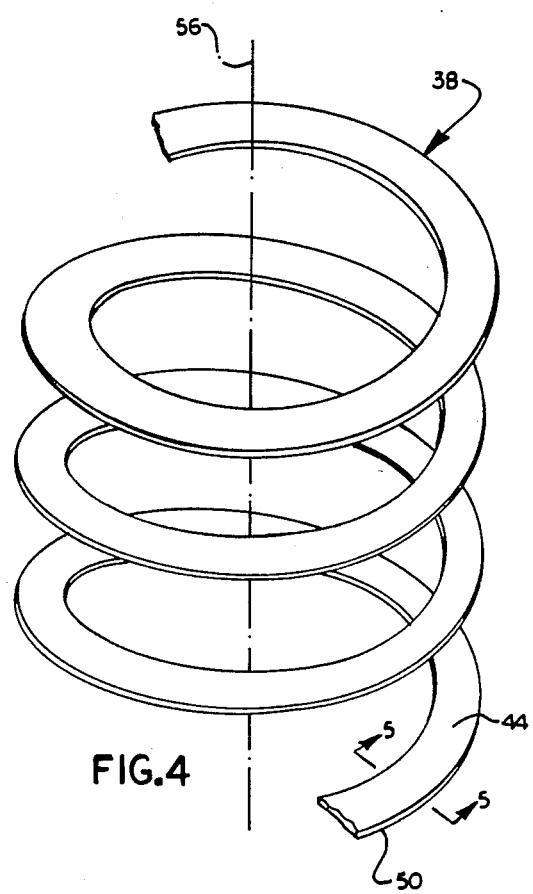
FIG. 4 is an illustration of a helical tape of foil.

In order to provide material for the metal matrix 28, a helical tape of metallic foil 38 (FIG. 3) is provided. The metallic tape that ultimately provides a metallic matrix may comprise metals and alloys of various types; e.g., titanium, titanium alloys and nickel, iron, or cobalt-based superalloys as well as others. The helical tape 38 of foil has inside and outside diameters which are the same as the inside and outside diameters of the helical tape 32 of filaments. However, the helical tape 38 of foil has one more turn than the helical tape 32 of filaments. The helical tape of foil is a continuous flate, soild tape with a rectangular cross sectional configuration (FIG. 4).

The helical tape 32 of filaments and the helical tape of foil are interleaved to form an interleaved helical assembly 42 (FIG. 6). Thus, upwardly facing major side surface 44 of the helical tape 38 foil is placed adjacent to a downwardly facing major side surface 46 of the helical tape 32 of filaments. Similarly, an upwardly facing major side surface 48 of the helical tape of filaments is placed adjacent to a downwardly facing major side surface 50 of the helical tape 38 of foil.

The turns of the helical tape 32 of filaments and the helical tape 38 of foil are aligned with each other so that the central axis 54 (FIG. 2) of the helical tape 32 of mono-filaments is coincident with a central axis 56 (FIG. 4) of foil. This results in the helical assembly 42 (FIG. 6) having a central axis 58 which is the common central axis for the helical tape 32 of filaments and the helical tape 38 of foil. The helical assembly 42 has the same inside and outside diameter throughout its axiel extent.

The space between the interleaved turns of the helical tape 32 of filaments and the helical tape 38 of foil are compressed or closed so that the major side surfaces 44 and 50 of the helical tape of foil abut the major side surfaces 46 and 48 of the helical tape 32 of filaments in the manner illustrated in the enlarged sectional view of FIG. 7. When the closed helical assembly 42 is viewed in a radial cross section, as shown in FIG. 7, the turns of the helical tape 32 of filaments 26 form a plurality of layers 62 of filaments 26 with lateral voids 27 therebetween disposed between a plurality of layers 64 of foil. The helical tape 38 of foil has one more complete turn than the helical tape 32 of filaments. Therefore, a layer 64 of foil is provided beneath the lower turn of the helical tape 32 of filaments and above the upper turn of the helical tape of filaments. In FIG. 6, the turn of foil layer 64 is broken at ends 38a for convenience; actually, foil layer 64 extends uninterrupted between broken ends 38a.

Although the filaments 26 are shown in cross section in FIG. 7, each of the filaments 26 extends from the beginning to the end of the helical tape 32 of filaments. Therefore, there are no joints in the filaments 26. Since each of the helical filaments 26 is free of joints, the helical filaments do not have any areas which are weaker than other areas of the filaments.

The helical filaments 26 are held in a spaced apart collimated relationship by the strands 33 of weaving material (FIG. 3). Therefore, the helical assembly 42 forms an annular article preform 68 (FIG. 7) which is not fully dense. In addition, the layers 62 and 64 of the article preform 68 are not interconnected. The article preform 68 has an annular configuration with inside and outside diameters which are the same as the inside and outside diameters of the helical tapes 32 and 38 of filaments and foil. In the illustrated embodiment of the invention, the preform 68 has a rectangular cross sectional configuration.

In order to obtain a fully dense article 10, it is necessry that the preform 68 be consolidated or compacted. In order to maximize the strength and the operating characteristics of the article 10, it is necessary to bond and consolidate the layers 62 and 64 of the preform 68 by filling voids 27 and bonding the mono-filaments in the matrix formed by the foil to form a unitary structure. However, during the compacting and bonding of the preform 68, it is imperative that the reinforcing filaments 26 are not cracked under the influence of tension forces or buckled under the influence of compression forces acting in the direction of the filament axis, that is in a direction parallel to a longitudinal central axis of a filament. Thus, the filaments 26 can be subjected to elastic forces along the filament of a magnitude large enough to cause only elastic deformation of the filaments. The filaments 26 are maintained free of forces along the filament of a magnitude sufficient to cause plastic deformation or fracture of the filaments.

Bonding and compaction of the article preform 68 are effected to increase the density of the article preform and form a unitary article 10 (FIG. 1). To this end, the entire preform 68 is enclosed in an annular opening 74 in a die 76. The annular opening 74 has a generally rectangular cross sectional configuration and is of substantially the same size as the preform 68. An annular punch 78 is sized to fit into the annular opening 74 and is used to apply pressure against the article preform 68 in the manner indicated by the arrow 80 in FIG. 8.

Before pressure is applied against the article preform 68 by the punch 78, the preform 68, die 76 and punch 78 are heated to a relatively high temperature sufficient to promote diffusion bonding of the components of the preform. Once this has been down, the punch 78 is pressed firmly downwardly against the preform 68. This results in the application of force against the major side surfaces of the helical tapes 32 and 38 of filaments and foil. The force against the preform 68 reduces distances between the layers 62 of filaments and causes the metal of the foil tape 38 to plastically flow into the lateral voids or spaces 27 between the filaments 26.

The die 76 restrains the preform 68 against radial expansion and contraction. Therefore, the filaments 26 are maintained free of plastic deformation forces extending axially along the filaments. This prevents the filaments from being cracked or buckled under the influence of axially extending forces along the filaments.

The force applied by the punch 78 in an axial direction to the annular preform 68 results in the material of the helical foil tape 38 flowing under plastic deformation forces into the lateral spaces 27 between the filaments 26 to form a fully dense article. Due to the relatively high temperature to which the preform 68 is heated and the pressure applied against the preform by the punch 78, the material of the helical tape 38 of foil is firmly bonded to the filaments 26 with a solid state diffusion bonding process. As this is occurring, the reinforcing filaments 26 do not undergo appreciable plastic flow.

The process may also be used for partial liquid phase bonding in a similar manner. The temperature in partial liquid phase bonding is just above the solidus temperature of the matrix alloy producing a material which contains a small amount of liquid phase plus solid phase during bonding; a so-called "mush consistency". Bonding is performed by heating preform 68 above the solidus temperature, bonding with a pressure much lower than required for solid state diffusion bonding, and cooling down below the solidus to complete the process.

The direction of deformation of the preform 68 in the die 76 is in an axial direction indicated by the arrow 80 in FIG. 8. Therefore, the preform 68 is compacted in a direction parallel to the central axis 58 of the helical assembly 42 (FIG. 6) with the helical mono-filaments compressed in the axial direction. This prevents radial buckling or cracking of the reinforcing filaments 26.

The extend of axial compression of the annular article preform 68 is equal to the volume of metal which must be displaced from the helical tape 38 of foil into the spaces 27 between the filaments 26 of the helical tape 32 of filaments. The force applied by the punch 78 against the article preform 68 causes the material of the layers 64 of foil to become interspersed with the filaments 26 in the layer 62 of filaments to thereby result in a decrease in the axial extent of the article preform. The filaments 26 are not stressed plastically in axial tension or compression in a direction along the filaments. Therefore, there is no tendency for the filaments to break or to buckle.

The resulting article 10 has a fully dense metal matrix 28 (FIG. 9) in which the helical reinforcing filaments 26 axially compressed are disposed and diffusion bonded in the matrix. Each of the reinforcing filaments 26 is continuous throughout the axial extend of the article 10. Thus, each helical filament extends from one axial end of the article 10 through a plurality of turns in a central portion of the article to the opposite axial end of the article with the axis of the helix substantially coincident with the rotational axis of the article 10. Since the filaments 26 are free of joints, they provide a very strong reinforcing for the article. The pressure applied during bonding is preferably controlled each that the filaments 26 retain a helical orientation, albeit axially compressed, by virtue of the matrix foil being consolidated around the filaments.

Once the article has been formed by a hot pressing operation in the manner previously described, the punch 78 is withdrawn and the article is removed from the die 76. To facilitate removal of the article from the die 76, the die is advantageously made incorporating an ejection mechanism consisting of circumferentially spaced apart ejection pins 75 and an annular ajector plate 77 or similar mechanisms which are widely used. Pins 75 can be actuated by suitable mechanical, hydraulic or other mechanisms to move ejector plate 77 upwardly in FIG. 8 to eject the article 10.

After the preform 68 has been bonded and densified to form the article 10 and the article has cooled, the annular article has inside and outside diameters which are substantially the same as the inside and outside diameters of the helical tapes 32 and 38. The fully dense article 10 can be used to reinforce many different types of componets of various types of machines. The article could be mounted in an opening formed in the component and held in place by a suitable mechanical connection. Alternately, the article could be bonded into a component using a secondary operation such as vacuum hot press diffusion bonding or hot isostatic pressing.

It is contemplated that it may be desirable to bond the annular reinforcing article 10 directly to the component which is to be reinforced rather than having the reinforcing ring be separate from the component or employing a two-step fabrication process. In the embodiment of the invention illustrated in FIG. 10, the reinforcing article 10 is bonded directly to a component which is to be reinforced. Since the embodiment illustrated in FIG. 10 is generally similar to the embodiment of the invention illustrated in FIGS. 1 through 9 similar numerals will be used to designate similar components, the suffix letter "a" being added to FIG. 10 to avoid confusion.

Figure 10:
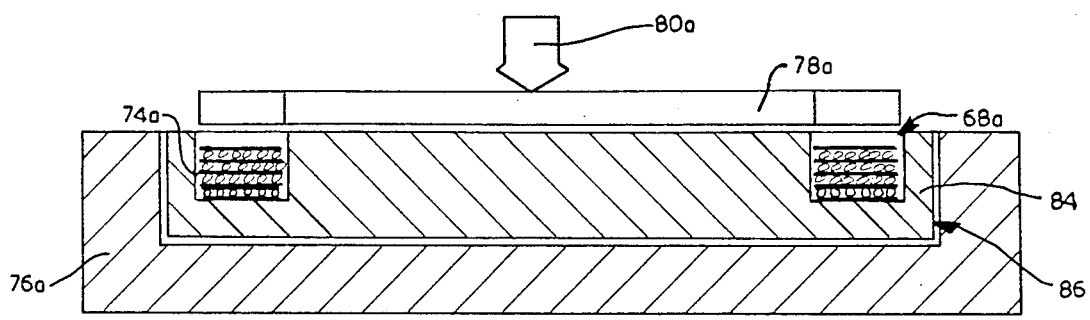
FIG. 10 is a schematic illustration, generally similar to FIG. 9, illustrating the closed helical assembly in a circular opening in a member to which it is to be bonded.

In the embodiment of the invention illustrated in FIG. 10, a circular housing 84 forming a part of an article to be reinforced with the annular ring 10 is positioned in a circular opening 86 in a die 76a. The housing section 84 has an upwardly facing annular opening 74a which is sized to receive the article preform 68a. After the die 76a, housing section 84 and a punch 78a have been heated to a temperature sufficient to promote diffusion bonding of the metal of the article preform 68a, the punch is pressed against the preform 68a to cause a plastic flow of the metal of the helical tape of foil between the filaments of the helical tape of filaments.

The housing section 84 may be made of the same or different metal as the helical tape of foil. The housing section 84 has been heated to a temperature sufficient to promote diffusion bonding of the metal of the helical tape of foil to the housing 84. Therefore, during densification and bonding of the metal of the preform 68a, the metal of the foil becomes bonded to the housing section 84.

Figure 11:
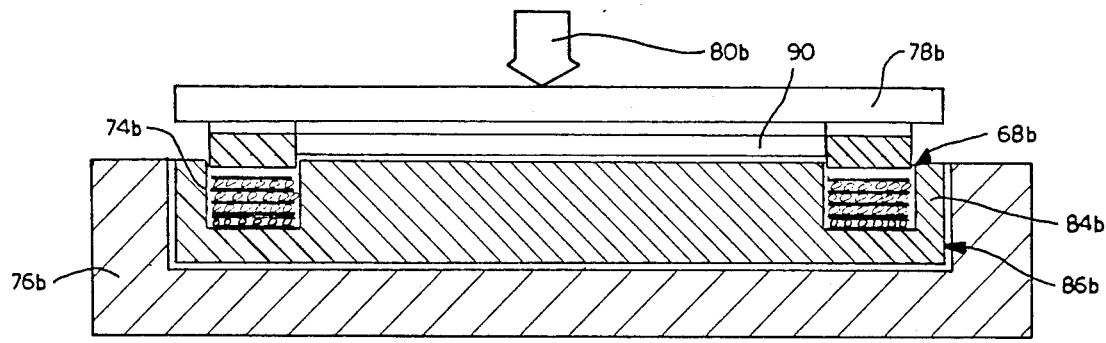
FIG. 11 is a schematic sectional view, generally similar to FIG. 10, illustrating the closed helical assembly in a cylindrical opening in a member to which it is to be bonded and illustrating a second member which is to be bonded to the helical assembly.

In the embodiment of the invention described in connection with FIG. 10, the punch 78a is removed from the opening 74a in the housing section 84 leaving the reinforcing ring exposed. The opening may be closed by bonding an insert during a secondary operation. However, it is contemplated that it may be desirable to close the opening 74a in the housing 84 with a single operation. In the embodiment of the invention illustraded in FIG. 11, the opening in the housing section is closed during consolidation. Since the embodiment of the invention illustrated in FIG. 11 is generally similar to the embodiment of the invention illustrated in FIG. 10, similar numerals will be utilized to describe similar components, the suffix letter "b" being associated with the numerals of FIG. 11 to avoid confusion.

A preform 68b, formed by interleaving a helical tape of filament and a helical tape of foil to form a helical assembly, is positioned in an annular opening 74b in the housing section 84b. The housing section 84b is located in an opening 86b formed in a die 76b. An annular housing ring 90 is provided to close and remain part of the annular opening 74b in the housing section 84b.

Once the preform 68b, die 76b, housing section 84b and closure ring 90 have been heated to a temperature sufficient to promote diffusion bonding of the material of the helical tape of foil to the filaments in the helical tape of filaments and to the housing section 84b and the closure ring 90, a force, indicated by the arrow 80b is applied against a punch 78b to press the closure ring 90 against the preform 68b. As this occurs, the metal tape of foil is diffusion bonded to the housing section 84b and to the closure ring 90. In addition, the metal of the preform 68b is diffusion bonded with filaments in the helical tape of filaments to form a fully dense reinforcing ring.

Figure 12:
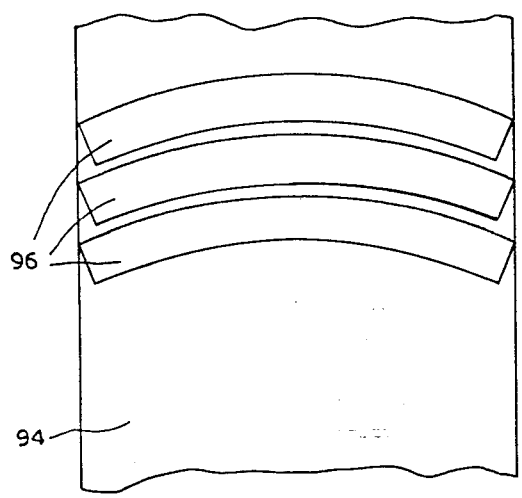
FIG. 12 is a plan view illustrating how arcuate segments are cut from a flat sheet of foil to form the helical tape of foil of FIG. 4.

The helical tape 38 of foil can be formed in many different ways. Thus, a strip 94 (FIG. 12) of foil could be cut into arcutate segments 96. The arcuate strips 96 would then be interconnected to form the continuous helical tape 38 of foil.

Figure 13:
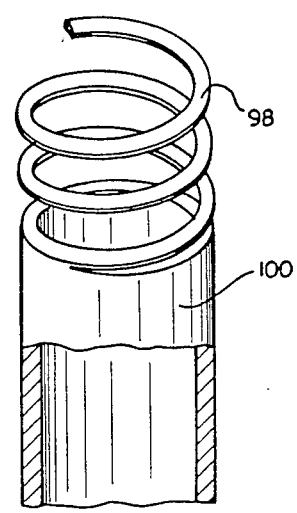
FIG. 13 is a schematic illustrating depicting the manner in which a helical tape of foil is cut from a tubular metal member.

The connecting of the arcuate strips 96 of foil can be eliminated by forming the helical tape 38 of foil from a continuous winding 98 (FIG. 13) cut from a tubular member 100. The continuous winding 98 has inside and outside diameters which are the same as the inside and outside diameters of the helical tape 38 of foil. Of course, the helical tape 38 of foil could be formed in other ways if desired.

Figure 14:
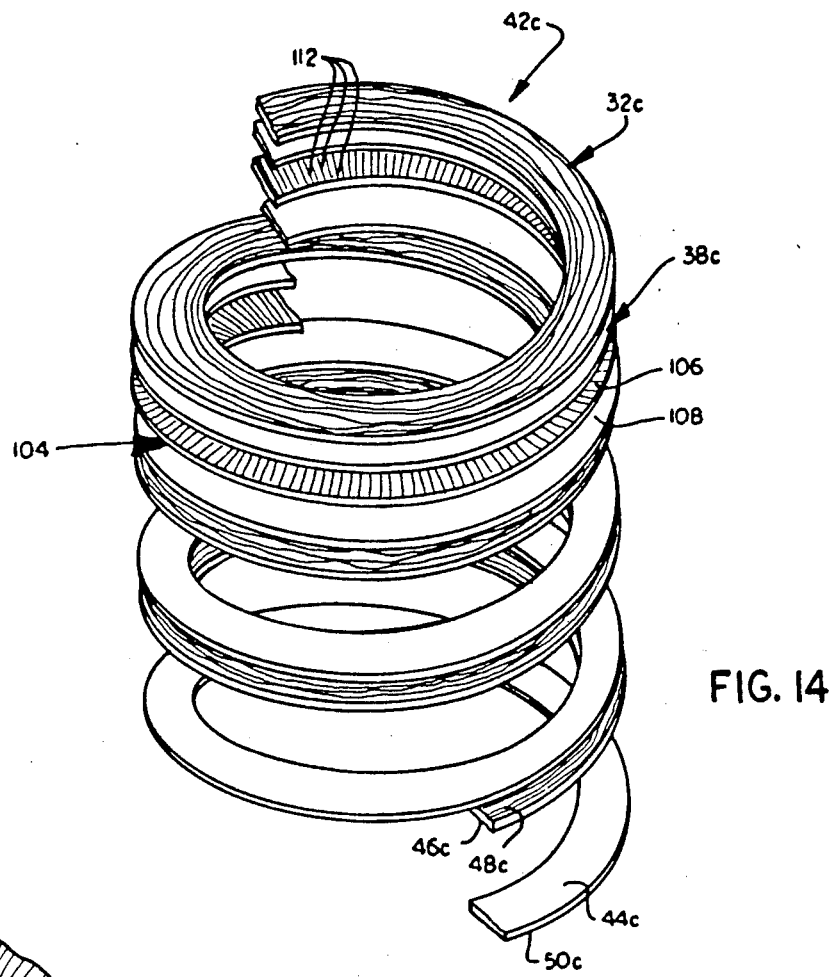
FIG. 14 is an illustration of a portion of a helical assembly having a radial reinforcing layer.
Figure 15:
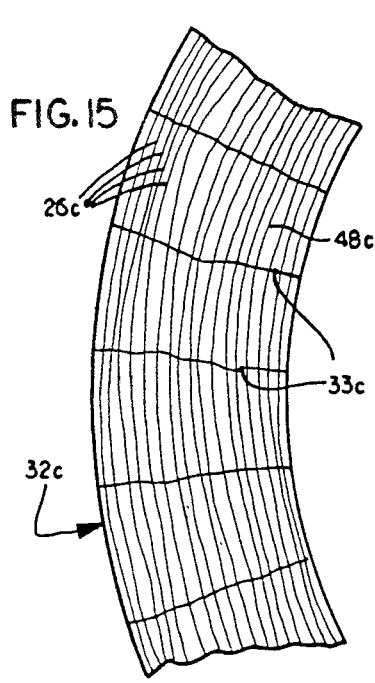
FIG. 15 is an enlarged fragmentary plan view of a portion of a helical tape of filaments used in the helical assembly of FIG. 14.
Figure 16:
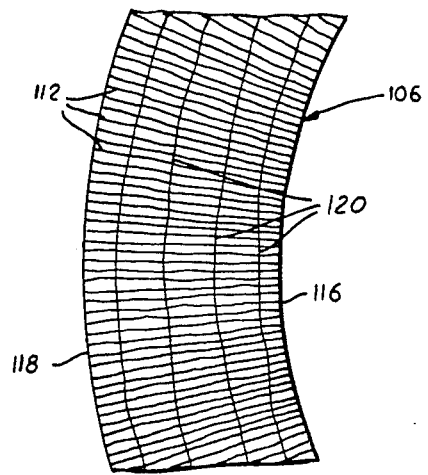
FIG. 16 is a fragmentary plan view illustrating the orientation of filaments in the reinforcing layer of FIG. 14.

When the article 10 is used in certain environments, the article may be subject to radial loads. In the embodiment of the invention shown in FIGS. 14–16, radial reinforcement is provided for the article. Since the embodiment of the invention shown in FIGS. 14–16 is generally similar to the embodiment of the invention shown in FIGS. 1–9 similar numerals will be utilized to designated similar components, the suffix letter "c" being associated with the embodiment of FIGS. 14–16 to avoid confusion.

A helical assembly 42c is formed by a helical tape 32c of filaments and a helical tape 38c of foil. The helical assembly 42c is provided with one or more layers of radial reinforcement, indicated at 104 in FIG. 14. The radial reinforcement 104 includes a circular layer 106 of filaments and a circular layer 108 of tape. The layer 106 is a flat, woven tape of the same size as one complete turn of the helical tape 32c of filaments. The layer 108 is a flat foil tape of the same size as the layer 106 and one complete turn of the helical tape 38c of foil. Although the layers 106 and 108 of filaments and tape have been shown as having a length equal to only one turn of the helical tapes 32c and 38c of filaments and foil, the layers 106 and 108 could be longer if desired.

The layer 106 of filaments includes a plurality of radially extending filaments 112 (FIG. 16) which extend between a circular inside edge 116 and a circular outside edge 118 in the annular layer 106 of reinforcing tape. Thus, the filaments 112 have a length which corresponds to the radial width of the reinfocing tape 106. The filaments 112 are disposed on radii of the circular layer 106. Therefore, the ends of the filaments 112 are closer together at the inner edge 116 of the layer 106 than at the outer edge 118. If desired, the filaments 112 could be skewed at an acute angle to the radial orientation shown in FIG. 16 or alternated in a plus and minus configuration.

The reinforcing tape 108 of foil has an inside diameter and outside diameter which is the same as the inside and outside diameter of the radial reinforcing tape or layer 106 of filaments. The length of the reinforcing tape 108 of foil is the same as the length of the reinforcing tape 106 of filaments. The lower major side surface of the reinforcing tape of foil 108 is disposed in abutting engagement with an upper major side surface 48c of the helical tape 32c of filaments 26c (FIG. 15). The lower major side surface of the radial reinforcing tape 106 is disposed in abutting engagement with the upper side surface 44c (FIG. 14) of the foil tape 108. Although the helical tape 32c of filaments has been shown in FIG. 14 as being at the upper end of the helical assembly 42c, it is contemplated that the helical tape 38c of foil will extend upwardly and over last turn of the helical tape 32c of filaments.

Since the filaments 112 in the radial reinforcing tape 106 extend radially (FIG. 16), the filaments 112 are effective to reinforce an article, similar to the article 10, against radial loads. Thus, the filaments 26c (FIG. 15) in the helical tape 32c of filaments extend throughout the length of the tape and have a helical configuration. The filaments 112 in the radial reinforcing tape 106 (FIG. 16) extend between opposite longitudinally extending edge portions 116 and 118 of the radial reinforcing tape and have a short, linear configuration. The filaments 112 are interconnected by strands 120 of weaving thread or wire.

Upon compaction of an article preform which includes the radial reinforcing tapes 106 and 108, the metal of the tape 108 flows into the radially extending spaces between the filaments 112 of the tape 106 and becomes bonded to the filaments to form a fully dense portion of the article. If desired, the radial reinforcing tapes 106 and 108 could be provided at several axially spaced apart locations along the helical assembly 42c. In addition, it is contemplated that the radial reinforcing tapes 106 and 108 could have a length which is greater than a single turn of the helical assembly 42c. Of course, the length of the radial reinforcing tapes 106 and 108 and the number of radial reinforcing tapes provided in the helical assembly 42c will depend upon the particular environment in which the resulting articles is to be used.

The method of the present invention can be used to make articles having many different configurations and having many different types of helical reinforcing filaments 26 disposed in matrices 28 of many different types of metal. However, one specific example of an article 10 which might be constructed in accordance with the present invention could have a plurality of helical boron reinforcing individual mono-filaments 26 disposed in a titanium-6 aluminum-4 vanadium metal matrix 28. This article is enclosed by a housing 84b of the same metal as the matrix, that is titanium-6 aluminum-4 vanadium.

In order to make this specific article, a helical tape 32 is formed of a boron polar fabric having a 2—2 twill weave construction. The helical boron mono-filaments 26 have a diameter of 0.0056 of an inch and are disposed with a spacing of 100 filaments per inch, that is a one inch width of the helical tape of filaments would contain 100 helical filaments 26 arranged in a side-by-side relationship. In this specific example, the helical tape 32 of filaments has a width of three quarters of an inch. This specific helical tape 32 has a nine inch outside diameter and a seven and a half inch inside diameter. The helical tape 32 of filaments extend for five complete turns. The filaments are interconnected by a copper wire weaving strand 33 having a diameter of 0.003 of an inch with fifteen strands per inch.

In this specific exmple, the helical tape 34 of foil has a thickness of 0.006 of an inch and a width of three quarters of an inch. The helical tape of foil has six turns. Therefore, a helical assembly 42 of the helical tape 32 of boron filaments and the helical tape 34 of foil has a layer of the foil tape at both ends of the helical assembly.

After the helical tape 32 of boron filaments and the helical titanium-6 aluminum-4 vandadium foil tape 38 of the present example have been interleaved to form a helix assembly 42, the helical assembly which forms a specific article preform 68 can be consolidated at sufficient temperature and pressure in the apparatus of FIG. 8 for a time sufficient to cause a bonding of metal of the helical tape 38 of foil to the boron filaments in the helical tape 32 of filaments and the formation of a fully dense consolidated reinforcing ring 10.

The present invention provides a method of forming a filamentary reinforced article 10 from a helical tape 32 of filaments and a helical tape 38 of foil. The helical tape 32 of filaments and the helical tape 38 of foil are interleaved to form a helical assembly 42 having turns of filaments interspersed with turns of foil. Deformation forces 80 are applied agaisnt the turns of helical assembly 42 in a direction parallel to the central axis 58 of the helical assembly. These formation forces bond the metal of the helical tape 38 of foil to the filaments 26 of the helical tape 32 of filaments while maintaining the filaments substantially free of plastic deformation forces extending axially along the filaments.

As the helical tape 32 of filaments and the helical tape 38 of foil are bonded together, they may also be bonded to a member 84 which they are to reinforce. If desired, radially reinforcing 104 can be provided between the turns of the helical assembly.

While certain preferred embodiments of the invention have been described above, those familar with the art will recognize that various modifications and changes can be made therein for practicing the invention as defined by the following claims:

I claim:

1. A method of forming an article comprising the steps of providing a helical tape of filaments, providing a helical tape of metal foil, interleaving the helical tape of filaments and the helical tape of metal foil to form a helical assembly having turns of filaments interspersed with turns of metal foil, applying deformation force against the turns of the helical assembly in a direction parallel to the central axis of the helical assembly and bonding the turns of the helical tape of metal foil to the turns of the helical tape of filaments while maintaining the filaments substantially free of plastic deformation forces extending axially along the filaments.

2. A method as set forth in claim 1 wherein said step of bonding the turns of the helical tape of metal foil to the turns of the helical tape of filaments include plastically deforming the turns of the tape of foil to form a one-piece circular metal matrix holding helical turns of filaments.

3. A method as set forth in claim 1 wherein said step of bonding the turns of the helical tape of foil to the turns of the helical tape of metal filaments includes decreasing the distance between turns of the helical tape of filaments.

4. A method as set forth in claim 1 wherein said step of providing a helical tape of filaments includes providing a flat woven tape of helical filaments interconnected by strands extending transversely to the filaments.

5. A method as set forth in claim 4 wherein said step of bonding the helical tape of metal foil to the helical tape of filaments includes plastically deforming the metal of the tape of foil to fill spaces between the helical filaments of the tape of filaments.

6. A method as set forth in claim 1 further including the step of providing a member having a circular opening, positioning the helical assembly in the circular opening in said member and thereafter, performing said steps of bonding the turns of helical tape of metal foil to the turns of the helical tape of filaments.

7. A method as set forth in claim 6 further including the step of bonding the turns of the helical tape of metal foil and the turns of the helical tape of filaments to said member while preforming said step of bonding the turns of the helical tape of metal foil and the helical tape of filaments.

8. A method as set forth in claim 1 wherein said step of providing a helical tape of filaments includes providing a tape in which each of the filaments extends throughout the length of the helical tape.

9. A method as set forth in claim 1 further including the step of providing a layer of filaments between the turns of the helical assembly with the central axis of the filaments of the layer of filaments extending transversely to the central axis to the filaments of the helical tape of filaments.

10. A method of forming an article, said method comprising the steps of providing a helical series of filaments disposed in a side-by-side relationship along a radius of the helical series of filaments and with each filament extending between axially opposite ends of the helical series of filaments, positioning metal foil between adjacent turns of the helical series of filaments, applying deformation forces against the turns of the helical series of filaments in a direction parallel to the central axis of the helical series of filaments, and bonding the metal foil to the helical series of filaments while maintaining the filaments substantially free of plastic deformation forces extending axially along the filaments.

11. A method as set forth in claim 10 further including positioning other filaments adjacent the helical series of filaments with said other filaments extending transversely to the filaments in the helical series of filaments.

12. A method as set forth in claim 10 further including positioning a layer of filaments between turns of the helical series of filaments with the filaments in the layer of filaments in a radially extending orientation relative to the central axis of the helical series of filaments.

13. A method as set forth in claim 10 wherein said step of positioning metal foil between the adjacent turns of the helical series of filaments includes interleaving a helical tape of metal foil with the helical series of filaments to form a helical assembly.

14. A method as set forth in claim 10 wherein said step of bonding the metal foil to the helical series of filaments includes plastically deforming the metal of the foil into spaces between adjacent filaments.

15. A method of forming an article comprising the steps of forming a helix having helical turns of mtallic matrix material interspersed with helical turns of side-by-side filaments having relatively high strength and low ductility compared to the metallic matrix material, applying a deformation force against the turns of the helix in a direction parallel to the central axis of the helix and bonding the turns of the metallic matrix material and turns of the filaments while maintaining the relatively high strength, low ductility filaments substantially free of plastic deformation forces extending axially along the filaments.

* * * * *

UNITED STATES PATENT AND TRADEMARK OFFICE
CERTIFICATE OF CORRECTION

PATENT NO. : 4,782,992

DATED : November 8, 1988

INVENTOR(S) : Gordon S. Doble

It is certified that error appears in the above-identified patent and that said Letters Patent is hereby corrected as shown below:

Title page, item [57]:
In the abstract, line 8, change "off oil" to --of foil--.

In the specification:

Column 7, line 55, change "arcutate" to --arcuate--.
Column 9, line 59, change "agaisnt" to --against--.
Column 10, line 24, after "tape of" insert --metal--.
Column 10, line 28, after "tape of" insert --metal--.
Column 10, line 29, delete "metal".
Column 12, line 9, change "mtallic" to --metallic.

Signed and Sealed this

Twenty-seventh Day of November, 1990

Attest:

HARRY F. MANBECK, JR.

*Attesting Officer*      *Commissioner of Patents and Trademarks*